(12) United States Patent
Kannan et al.

(10) Patent No.: US 10,404,434 B2
(45) Date of Patent: Sep. 3, 2019

(54) DISCOVERY AND RANDOM ACCESS FOR SHARED SPECTRUM

(71) Applicant: QUALCOMM Incorporated, San Diego, CA (US)

(72) Inventors: Arumugam Chendamarai Kannan, San Diego, CA (US); Andrei Dragos Radulescu, San Diego, CA (US); Chirag Sureshbhai Patel, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 15/899,060

(22) Filed: Feb. 19, 2018

(65) Prior Publication Data

US 2018/0241526 A1 Aug. 23, 2018

Related U.S. Application Data

(60) Provisional application No. 62/461,704, filed on Feb. 21, 2017.

(51) Int. Cl.
*H04W 4/00* (2018.01)
*H04L 5/00* (2006.01)
*H04W 56/00* (2009.01)
*H04W 74/08* (2009.01)
(Continued)

(52) U.S. Cl.
CPC ............ *H04L 5/0048* (2013.01); *H04B 7/04* (2013.01); *H04B 7/0695* (2013.01);
(Continued)

(58) Field of Classification Search
CPC ......... H04B 7/04; H04L 5/0007; H04L 5/001; H04L 5/0048; H04L 27/0006;
(Continued)

(56) References Cited

U.S. PATENT DOCUMENTS 9,907,066 B2* 2/2018 Park ................. H04L 5/0048
10,057,839 B2* 8/2018 Ng ..................... H04W 48/16
(Continued)

OTHER PUBLICATIONS

Huawei, R1-1608846, Synchronization Signal Design in NR, 3GPP TSG RAN WG1 Meeting #86bis, 5 pages, Oct. 2016.*
(Continued)

*Primary Examiner* — Frank Duong
(74) *Attorney, Agent, or Firm* — Holland & Hart LLP

(57) ABSTRACT

Methods, systems, and devices for wireless communication are described that involve determining multiple beamformed transmission beams for transmission of an opportunistic or multi-beam discovery reference signal (DRS) over a shared radio frequency spectrum band. The base station may determine a contention exempt transmission (CET) period for the shared spectrum band and transmit the DRS using multiple transmission beams during CET period or the base station may perform a listen before talk (LBT) procedure, and transmit, based on the LBT procedure, the DRS over a shared radio frequency spectrum band. The base station may transmit an indication of the type of DRS transmission, a subframe offset, random access configurations, and/or error correcting codes to enable a user equipment to discover, connect to, and acquire timing information associated with the network.

30 Claims, 14 Drawing Sheets

(51) Int. Cl.
*H04W 16/14* (2009.01)
*H04B 7/04* (2017.01)
*H04L 27/00* (2006.01)
*H04B 7/06* (2006.01)

(52) U.S. Cl.
CPC ......... *H04L 27/0006* (2013.01); *H04W 16/14* (2013.01); *H04W 56/0005* (2013.01); *H04W 74/0833* (2013.01)

(58) Field of Classification Search
CPC . H04W 16/14; H04W 56/0005; H04W 74/08; H04W 74/0833
See application file for complete search history.

(56) References Cited

U.S. PATENT DOCUMENTS

| | | | |
|---|---|---|---|
| 2016/0127098 A1* | 5/2016 | Ng | H04L 5/0048 370/329 |
| 2016/0381589 A1 | 12/2016 | Zhang et al. | |
| 2017/0033851 A1* | 2/2017 | Zhong | H04B 7/0413 |
| 2018/0198575 A1* | 7/2018 | Sheng | H04J 11/0069 |

OTHER PUBLICATIONS

Ke et al, Research on Compact Discovery Reference Signal for Future Synchronized Network, IEEE, 4 pages, 2014.*

3GPP: "3rd Generation Partnership Project; Technical Specification Group Radio Access Network; Study on New Radio (NR) Access Technology Physical Layer Aspects (Release14)", R1-1702796, TR 38.802 (V1.2.0) V3, Mobile Competence Centre; 650, Route Des Lucioles; F-06921, Sophia-Antipolis Cedex; France, Feb. 15, 2017 (Feb. 15, 2017), pp. 1-82, XP051222025, Retrieved from the Internet: URL:http://www.3gpp.org/ftp/tsg_ran/WG1_RL1/TSGR1_88/Docs/.

Ericsson: "NR Four-Step Random Access Procedure", 3GPP Draft; R1-1702128, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017 (Feb. 12, 2017), 7 pages, XP051209288, Retrieved from the Internet: URL: http://www.3gpp.org/ftp/Meetings_3GPP_SYNC/RAN1/Docs/ .

International Search Report and Written Opinion—PCT/US2018/018796—ISA/EPO—dated May 3, 2018 (171876WO).

"Zte et al., "Overview of NR initial access", 3GPP Draft, R1-1611272, 3rd Generation Partnership Project (3GPP), Mobile Competence Centre; 650, Route Des Lucioles; F-06921, Sophia-Anti Polis Cedex; France, vol. RAN WG1, No. Reno, USA; Nov. 14, 2016-Nov. 18, 2016, Nov. 13, 2016 (Nov. 13, 2016), 4 pages, XP051175253, Retrieved from the Internet: URL: http://www.3gpp.org/ftp/Meetings_3GPP_SYNC/RAN1/Docs/ ".

* cited by examiner

DISCOVERY AND RANDOM ACCESS FOR SHARED SPECTRUM

CROSS REFERENCES

The present application for patent claims priority to U.S. Provisional Patent Application No. 62/461,704 by Chendamarai Kannan et al., entitled "Discovery and Random Access For Shared Spectrum," filed Feb. 21, 2017, assigned to the assignee hereof.

BACKGROUND

The following relates generally to wireless communication, and more specifically to discovery and random access for shared spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In wireless communications systems, discovery reference signals (DRSs) may be used to discover and connect to a base station in a network. DRSs may be used in wireless communications systems such as an LTE or NR system as well as systems that support operation over a shared radio frequency spectrum. However, timing acquisition for DRS transmissions in a shared spectrum may be complex due to timing uncertainty associated with the DRS transmission. Other challenges such as medium availability may also affect discovery in a wireless communications system that supports shared spectrum operation.

SUMMARY

The described techniques relate to improved methods, systems, devices, or apparatuses that support discovery and random access for shared spectrum. Generally, the described techniques provide for resolving timing uncertainties associated with discovery reference signal (DRS) transmissions. In some examples, the technique may involve an implicit or explicit indication of the type of DRS transmission, subframe offset(s), random access configuration and/or opportunities, cyclic shifts, and error detection codes (e.g., Walsh code, Orthogonal Cover Code (OCC)). Random access and timing acquisition may then be performed by a user equipment (UE) based on the received DRS transmissions, thereby enabling discovery and connection to the network.

A method of for wireless communication is described. The method may include determining a DRS interval for transmission of a DRS over a shared radio frequency spectrum band, determining a set of synchronization signal (SS) blocks for transmission of the DRS based at least in part on a set of transmission beams, wherein each SS block of the set of SS blocks indicates a random access configuration, transmitting, over the shared radio frequency spectrum band, the set of SS blocks during the DRS interval using one or more transmission beams of the set of transmission beams, and receiving, from a first UE, a random access message during the DRS interval based at least in part on the random access configuration for at least one SS block of the set of SS blocks.

An apparatus for wireless communication is described. The apparatus may include means for determining a DRS interval for transmission of a DRS over a shared radio frequency spectrum band, means for determining a set of SS blocks for transmission of the DRS based at least in part on a set of transmission beams, wherein each SS block of the set of SS blocks indicates a random access configuration, means for transmitting, over the shared radio frequency spectrum band, the set of SS blocks during the DRS interval using one or more transmission beams of the set of transmission beams, and means for receiving, from a first UE, a random access message during the DRS interval based at least in part on the random access configuration for at least one SS block of the set of SS blocks.

Another apparatus for wireless communication is described. The apparatus may include a processor, memory in electronic communication with the processor, and instructions stored in the memory. The instructions may be operable to cause the processor to determine a DRS interval for transmission of a DRS over a shared radio frequency spectrum band, determine a set of SS blocks for transmission of the DRS based at least in part on a set of transmission beams, wherein each SS block of the set of SS blocks indicates a random access configuration, transmit, over the shared radio frequency spectrum band, the set of SS blocks during the DRS interval using one or more transmission beams of the set of transmission beams, and receive, from a first UE, a random access message during the DRS interval based at least in part on the random access configuration for at least one SS block of the set of SS blocks.

A non-transitory computer readable medium for wireless communication is described. The non-transitory computer-readable medium may include instructions operable to cause a processor to determine a DRS interval for transmission of a DRS over a shared radio frequency spectrum band, determine a set of SS blocks for transmission of the DRS based at least in part on a set of transmission beams, wherein each SS block of the set of SS blocks indicates a random access configuration, transmit, over the shared radio frequency spectrum band, the set of SS blocks during the DRS interval using one or more transmission beams of the set of transmission beams, and receive, from a first UE, a random access message during the DRS interval based at least in part on the random access configuration for at least one SS block of the set of SS blocks.

Some examples of the method, apparatus, and non-transitory computer-readable medium described above may further include processes, features, means, or instructions for receiving a DRS initiation request from the first UE. Some examples of the method, apparatus, and non-transitory computer-readable medium described above may further include processes, features, means, or instructions for transmitting an opportunistic DRS based at least in part on the received DRS initiation request.

Some examples of the method, apparatus, and non-transitory computer-readable medium described above may further include processes, features, means, or instructions for transmitting the opportunistic DRS within a fixed timing offset after receiving the DRS initiation request.

Some examples of the method, apparatus, and non-transitory computer-readable medium described above may further include processes, features, means, or instructions for transmitting the opportunistic DRS concurrently with a control channel or a shared channel over at least one transmission beam of the set of transmission beams.

In some examples of the method, apparatus, and non-transitory computer-readable medium described above, the opportunistic DRS may be transmitted to one or both of the first UE or a second UE different from the first UE.

In some examples of the method, apparatus, and non-transitory computer-readable medium described above, transmitting the set of SS blocks during the DRS interval comprises: repeating a subset of SS blocks of the set of SS blocks within an SS burst, wherein at least one SS block within the subset of SS blocks indicates a random access opportunity.

In some examples of the method, apparatus, and non-transitory computer-readable medium described above, at least one SS block indicates the random access opportunity in both an initial transmission and a subsequent transmission.

In some examples of the method, apparatus, and non-transitory computer-readable medium described above, a first SS block of the subset of SS blocks indicates a first random access opportunity and a second block of the subset of SS blocks indicates a second random access opportunity different from the first random access opportunity.

In some examples of the method, apparatus, and non-transitory computer-readable medium described above, an SS block of the subset of SS blocks in an initial transmission comprises a different cyclical shift for a first physical broadcast channel (PBCH) transmitted within the SS block from a second PBCH transmitted within a corresponding SS block in a subsequent transmission.

In some examples of the method, apparatus, and non-transitory computer-readable medium described above, an SS block of the subset of SS blocks in an initial transmission comprises a first PBCH payload that may be different from a second PBCH payload of a corresponding SS block in a subsequent transmission.

In some examples of the method, apparatus, and non-transitory computer-readable medium described above, a payload difference between the first PBCH payload and the second PBCH payload may be based at least in part on a first index associated with the SS block and a second index associated with the corresponding SS block in the subsequent transmission.

In some examples of the method, apparatus, and non-transitory computer-readable medium described above, an SS block of the subset of SS blocks in an initial transmission comprises a different cyclical shift for a first synchronization signal transmitted within the SS block from a second synchronization signal transmitted within a corresponding SS block in a subsequent transmission.

In some examples of the method, apparatus, and non-transitory computer-readable medium described above, at least one of the determined set of SS blocks indicates a subframe offset.

In some examples of the method, apparatus, and non-transitory computer-readable medium described above, the DRS comprises an indication of a DRS type.

In some examples of the method, apparatus, and non-transitory computer-readable medium described above, a PBCH of the DRS comprises the indication and the DRS type comprises one of a multi-beam DRS or an opportunistic DRS.

In some examples of the method, apparatus, and non-transitory computer-readable medium described above, an index of each SS block in the set of SS blocks maps to multiple random access opportunities within the DRS interval.

In some examples of the method, apparatus, and non-transitory computer-readable medium described above, the random access configuration indicates at least one of a cyclic shift for a UE, a frequency resource for the UE, an SS block index, a Walsh code index, an OCC index, or any combination thereof.

Some examples of the method, apparatus, and non-transitory computer-readable medium described above may further include processes, features, means, or instructions for transmitting each SS block of the set of SS blocks over a corresponding transmission beam of the set of transmission beams.

Some examples of the method, apparatus, and non-transitory computer-readable medium described above may further include processes, features, means, or instructions for performing a listen before talk (LBT) procedure for the DRS prior to transmitting at least one SS block in the set of SS blocks.

A method of for wireless communication is described. The method may include determining a DRS interval for reception of a DRS over a shared radio frequency spectrum band, receiving, during the DRS interval, a SS block indicating a random access configuration, determining a random access opportunity based at least in part on the random access configuration, and transmitting, to a base station, a random access request message during the random access opportunity.

An apparatus for wireless communication is described. The apparatus may include means for determining a DRS interval for reception of a DRS over a shared radio frequency spectrum band, means for receiving, during the DRS interval, a SS block indicating a random access configuration, means for determining a random access opportunity based at least in part on the random access configuration, and means for transmitting, to a base station, a random access request message during the random access opportunity.

Another apparatus for wireless communication is described. The apparatus may include a processor, memory in electronic communication with the processor, and instructions stored in the memory. The instructions may be operable to cause the processor to determine a DRS interval for reception of a DRS over a shared radio frequency spectrum band, receive, during the DRS interval, a SS block indicating a random access configuration, determine a random access opportunity based at least in part on the random access configuration, and transmit, to a base station, a random access request message during the random access opportunity.

A non-transitory computer readable medium for wireless communication is described. The non-transitory computer-readable medium may include instructions operable to cause a processor to determine a DRS interval for reception of a DRS over a shared radio frequency spectrum band, receive, during the DRS interval, a SS block indicating a random access configuration, determine a random access opportunity based at least in part on the random access configuration, and transmit, to a base station, a random access request message during the random access opportunity.

Some examples of the method, apparatus, and non-transitory computer-readable medium described above may further include processes, features, means, or instructions for determining, based at least in part on the random access configuration, at least one of a cyclic shift for a UE, a frequency resource for the UE, an SS block index, a Walsh code index, an OCC index, or any combination thereof.

Some examples of the method, apparatus, and non-transitory computer-readable medium described above may further include processes, features, means, or instructions for determining multiple random access opportunities based at least in part on an index of the received SS block.

Some examples of the method, apparatus, and non-transitory computer-readable medium described above may further include processes, features, means, or instructions for receiving, during the DRS interval, multiple repetitions of a set of SS blocks within an SS burst, wherein at least one SS block within the set of SS blocks indicates one or more random access opportunities.

In some examples of the method, apparatus, and non-transitory computer-readable medium described above, an SS block index or a PBCH within the DRS comprises an indication of a DRS type.

Some examples of the method, apparatus, and non-transitory computer-readable medium described above may further include processes, features, means, or instructions for transmitting a DRS initiation request to the base station. Some examples of the method, apparatus, and non-transitory computer-readable medium described above may further include processes, features, means, or instructions for receiving an opportunistic DRS based at least in part on the DRS initiation request.

DETAILED DESCRIPTION

Figure 1:
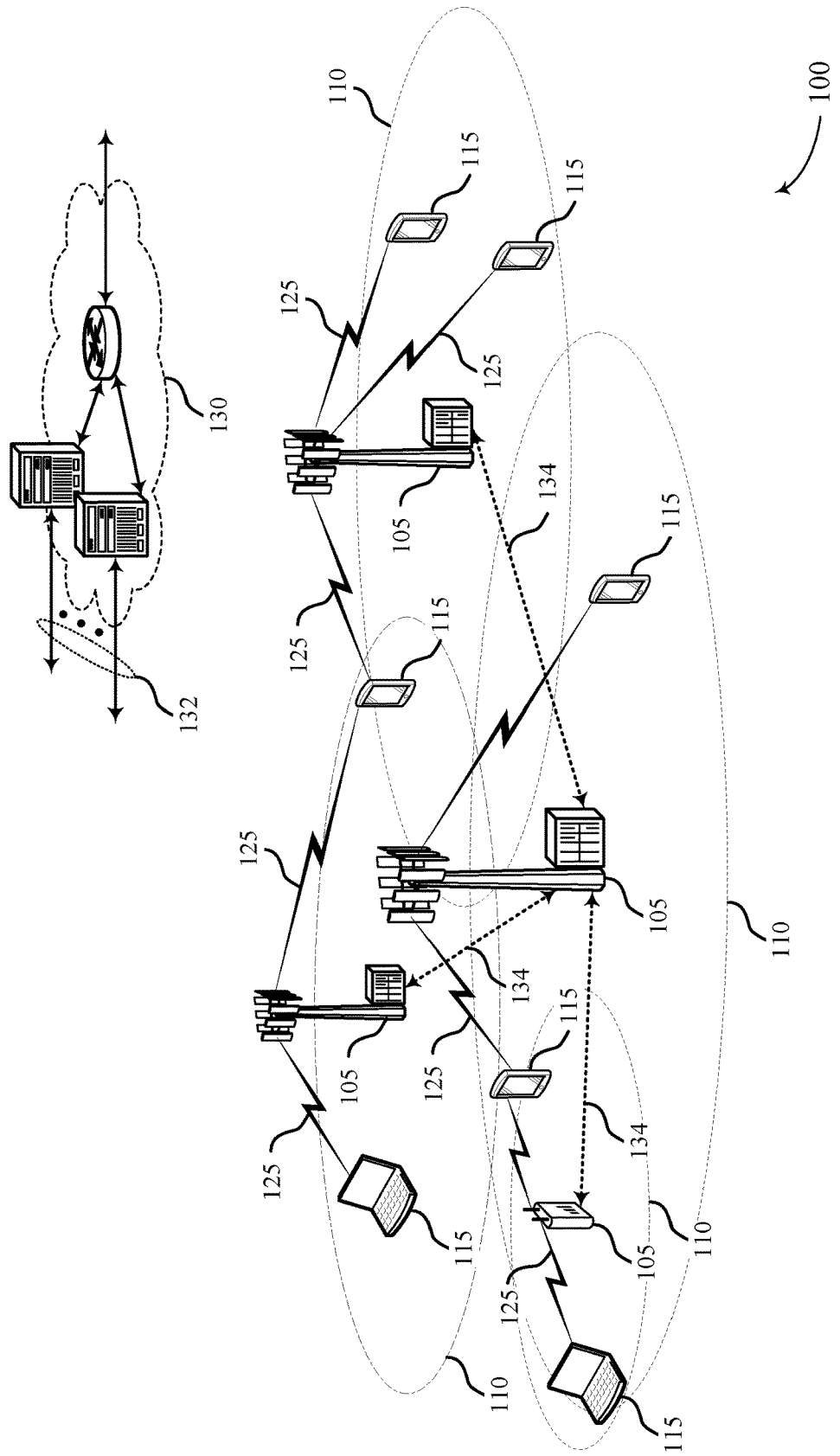
FIG. 1 illustrates an example of a wireless communications system that supports discovery and random access for shared spectrum in accordance with aspects of the present disclosure.

In wireless communications systems, a discovery reference signal (DRS) may be used to enable a user equipment (UE) to discover and connect to a cell, a base station, or another node in a network. Some examples of signals that may be included in a DRS may be a primary synchronization signal (PSS), a secondary synchronization signal (SSS), a Physical Broadcast Channel (PBCH), a cell-specific reference signal (CRS), a channel state information reference signal (CSI-RS), etc. In addition to cell discovery, DRS may also be used for paging, radio resource management (e.g., handover or mobility), random access channel (RACH) configuration, timing acquisition, and radio link measurements.

In some cases, a DRS may also be used in wireless communications systems operating in millimeter wave (mmW) spectrum. In some cases, mmW communication systems may implement the use of multiple transmission beams to generate beamformed signals to compensate for path losses due to rapid changes in channel conditions. Receivers may be configured to utilize one or more antennas to receive such signals and may also be configured to participate in a beam refinement procedure with a transmitting device to determine a beam and antenna array pairing for use in future communications. In some cases, the use of narrow beam patterns may additionally serve to optimize the link budget or signal-noise-ratio (SNR) in the wireless communications system.

Beamforming signals may also be used in wireless communications systems operating in a shared or unlicensed spectrum of a New Radio (NR) network to reduce interference and support efficient use of frequency resources. For example, a base station may transmit a plurality of a DRS signals in a directional manner where each DRS is transmitted periodically in a different direction. This technique of transmitting a DRS over multiple beams in different directions may be referred to as multi-beam DRS. In some cases, a multi-beam DRS transmission may involve repeating transmission of synchronization signal (SS) blocks within one or more SS bursts. In some other cases, DRS may be transmitted on a single beam, and this technique may be referred to as a directional DRS transmission.

In some systems, DRS transmissions may be implemented according to multi-beam DRS or opportunistic DRS techniques. In some cases, a multi-beam DRS may utilize a fixed location in time to transmit DRS, while an opportunistic DRS may utilize a floating time window, which in some cases may be pre-designated for transmission of DRS. In some cases, timing acquisition may be complex or uncertain under the directional DRS scheme due to the floating timing window during which DRS is transmitted.

In some techniques, a subframe offset and type of DRS (multi-beam or directional) may be signaled in the DRS (e.g., via the PBCH), while maintaining the same DRS structure for the two types of DRS (opportunistic or multi-beam). The subframe offset may provide an indication of the subframe that includes the DRS. For a multi-beam DRS, the offset may be set to zero, whereas an opportunistic DRS may be indicated using a non-zero value. In some cases, the subframe offset may correspond to the subframe offset associated with each SS block from a set of one or more SS blocks. In some other cases, the subframe offset may correspond to the subframe offset of a first SS block from a set of repeated SS blocks.

In some cases, timing uncertainties may be associated with the repeated transmission of SS blocks within one or more SS bursts, the SS repetitions pointing to one or more random access opportunities. A DRS may include repetitions of sets of SS blocks within an SS burst, and distinguishing between different SS repetitions may be beneficial in resolving timing ambiguity. Thus, in some aspects, cyclic codes may be used to distinguish between different SS blocks, while keeping the same PBCH payload across different SS repetitions.

Implementations of the above solutions may be used in a random access procedure between a base station and a UE. For instance, the UE may listen for a DRS (either opportunistic or multi-beam) transmitted over multiple transmission beams and may determine one or more RACH opportunities, which may be indicated in one or both of directional and multi-beam DRS transmissions.

Aspects of the disclosure are initially described in the context of a wireless communications system. Aspects are then described with reference to a process and a process flow. Aspects of the disclosure are further illustrated by and described with reference to apparatus diagrams, system diagrams, and flowcharts that relate to discovery and random access for shared spectrum.

FIG. 1 illustrates an example of a wireless communications system 100 supports discovery and random access for shared spectrum in accordance with aspects of the present disclosure. The wireless communications system 100 includes base stations 105, UEs 115, and a core network 130. In some examples, the wireless communications system 100 may be a Long Term Evolution (LTE), LTE-Advanced (LTE-A), or an NR network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1). Base stations 105 may communicate with one another over backhaul links 134 (e.g., X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming service.

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Synchronization (e.g., cell acquisition) may be performed using synchronization signals or channels transmitted by a synchronization source (e.g., a base station 105). A base station may transmit synchronization signal blocks containing discovery reference signals. Synchronization signals may include a PSS or an SSS. A UE 115 attempting to access a wireless network may perform an initial cell search by detecting a PSS from a base station 105. The PSS may enable synchronization of slot timing and may indicate a physical cell identity value or a portion of a cell identity value. The PSS may be utilized to acquire timing and frequency portions of a cell identification (e.g., physical cell identifier (PCID)). The UE 115 may then receive an SSS. The SSS may enable radio frame synchronization, and may provide a cell identity value, which may be combined with the physical cell identity value to identify the cell. The SSS may also enable detection of a duplexing mode and a cyclic prefix (CP) length. An SSS may be used to acquire the full PCID and other system information (e.g., subframe index). The PBCH may be used to acquire additional system information needed for acquisition (e.g., bandwidth, frame index, etc.). In some examples, a base station 105 may transmit an SSS but not a PSS, or a combined synchronization signal.

After receiving the PSS and SSS, the UE 115 may receive a master information block (MIB), which may be transmitted in a downlink physical channel for broadcast information (e.g., a PBCH). The MIB may contain system bandwidth information, a system frame number (SFN), a subframe number, and a physical hybrid automatic repeat request (HARQ) indicator channel (PHICH) configuration. After decoding the MIB, the UE 115 may receive one or more system information blocks (SIBs). Different SIBs may be defined according to the type of system information conveyed. SIB1 includes access information such as cell identity information, and may also indicate whether a UE 115 is allowed to camp on a cell. SIB1 also includes cell selection information (or cell selection parameters). Additionally, SIB1 includes scheduling information for other Ms. SIB2 includes access information and parameters related to common and shared channels. SIB3 includes cell reselection parameters. SIB4 and SIB5 include reselection information about neighboring LTE cells. SIB6 through SIB8 include reselection information about non-LTE neighboring cells. SIB9 includes the name of a Home eNB. SIB10 through SIB12 include emergency notification information (e.g., tsunami and earthquake warnings) and SIB13 includes information related to multimedia broadcast multicast services (MBMS) configuration A UE 115 attempting to access a wireless network may perform an initial cell search by detecting a PSS from a base station 105. The PSS may enable synchronization of slot timing and may indicate a physical cell identity value or a portion of a cell identity value. The UE 115 may then receive an SSS. The SSS may enable radio frame synchronization, and may provide a cell identity value, which may be combined with the physical cell identity value to identify the cell. The SSS may also enable detection of a duplexing mode and a cyclic prefix length. Some systems, such as time division duplexing (TDD) systems, may transmit an SSS but not a PSS. After receiving the PSS and SSS, the UE 115 may receive a MIB, which may be transmitted in the PBCH. The MIB may contain system bandwidth information, an SFN, and a PHICH configuration. After decoding the MIB, the UE 115 may receive one or more Ms. For example, SIB1 may contain cell access parameters and scheduling information for other SIBs. Decoding SIB1 may enable the UE 115 to receive SIB2. SIB2 may contain Radio Resource Control (RRC) configuration information related to RACH procedures, paging, PUCCH, PUSCH, power control, SRS, and cell barring.

Wireless communications system 100 may operate in an ultra high frequency (UHF) frequency region using frequency bands from 700 MHz to 2600 MHz (2.6 GHz), although some networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.7

Thus, wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station 105) and a receiver (e.g. a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for CA. CA may be used with both frequency division duplexing (FDD) and TDD CCs.

In some cases, wireless communications system 100 may utilize enhanced CCs (eCCs). An eCC may be characterized by one or more features including: wider bandwidth, shorter symbol duration, shorter TTIs, and modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Figure 2:
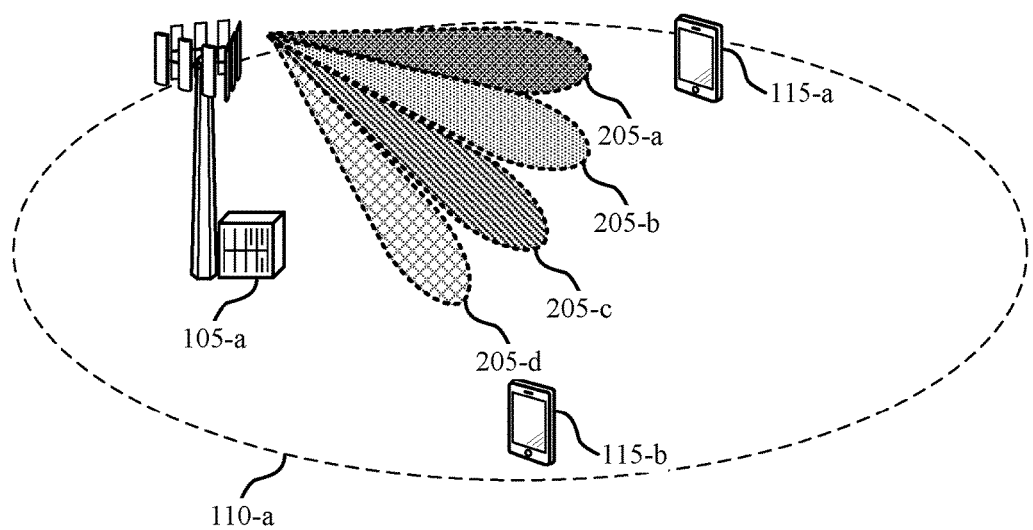
FIG. 2 illustrates an example of a wireless communications system that supports discovery and random access for shared spectrum in accordance with aspects of the present disclosure.

FIG. 2 illustrates an example of a wireless communications system 200 that supports discovery and random access for shared spectrum in accordance with aspects of the present disclosure. The wireless communications system 200 may include one or more UEs 115 (e.g., UE 115-*a* and UE 115-*b*) and a base station 105-*a*, which may be examples of the UE 115 and base station 105 described with reference to FIG. 1. Broadly, wireless communications system 200 illustrates aspects of different schemes for transmission of DRS between base station 105-*a* and a UE 115, operating using a shared spectrum within coverage are 110-*a*.

In wireless communications system 200, a DRS may be used to enable one or more of UEs 115 to discover and connect to base station 105-*a*. Some examples of signals that serve as DRS may be a PSS, an SSS, a PBCH, a CRS, a CSI-RS, etc. In addition to cell discovery, DRS may also be used for paging, radio resource management (e.g., handover or mobility), RACH configuration, timing acquisition, and radio link measurements.

In some cases, wireless communications system 200 may use beams or one or more beamformed signals 205 (e.g., beamformed signal 205-*a*, beamformed signal 205-*b*, beamformed signal 205-*c*, or beamformed signal 205-*d*) for transmission and/or reception. For example, in some cases, the base station 105-*a* may transmit a plurality of beamformed signals 205 (e.g., DRS) in a shaped or directional manner where each beamformed signal 205 is transmitted periodically in a different direction. For example, beamformed signal 205-*a* may be transmitted in a first direction or a first shape, beamformed signal 205-*b* may be transmitted in a second direction or a second shape, and so on.

This technique of transmitting a DRS over multiple beams in different directions may be referred to as multi-beam DRS. In some cases, a multi-beam DRS transmission may include repeated transmissions of SS blocks within one or more SS bursts, the SS block repetitions pointing to one or more multi-beam RACH opportunities for UE 115.

In some cases, base station 105-*a* may transmit two different types of DRS (e.g., multi-beam DRS or opportunistic DRS). As DRS may enable the UE 115 to connect to the base station 105-*a*, the UE 115 may also utilize the DRS to acquire timing information for synchronization with the base station 105-*a*. In addition to exchanging or acquiring timing information, the DRS may also indicate RACH opportunities available for the UE 115.

In some cases, multi-beam DRS may be deployed in a contention exempt or contention based manner. Under a contention exempt transmission (CET) scheme, the base station 105-*a* may periodically transmit a plurality of beamformed signals 205 in different directions. In some cases, each of the multi-beam DRS may map to one or more RACH opportunities. In some other cases, multi-beam DRS may utilize a contention based scheme, such as a LBT procedure, or other channel reservation techniques. For example, LBT or channel reservation may be performed over one or more beams or a union of beam directions, and beamformed signals 205 containing DRS may be transmitted upon determination that the channel or medium is clear.

In some cases, DRS may be transmitted over a single beamformed signal 205 (e.g., beamformed signal 205-*a*), and this technique may be referred to as an opportunistic DRS transmission. In some opportunistic DRSs, the beam width of the beamformed signal 205 may be selected by base station 105-*a*. For example, the base station 105-*a* may transmit a narrow directional beamformed signal 205. In some other cases, the beamformed signal 205 may have a wide beam-width, or may be omni-directional by encompassing multiple beam directions.

In some cases, an opportunistic DRS scheme may involve a DRS multiplexed or transmitted concurrently with a downlink transmission, such as a Physical Downlink Shared Channel (PDSCH) or Physical Downlink Control Channel (PDCCH), or any other downlink channel. In some other cases, the base station 105-*a* may transmit DRS pseudo-periodically in a floating time window, based on availability of the medium. This may allow staggering of the DRS over multiple directions, and may serve to reduce the initial acquisition time between the base station 105-*a* and the UE 115, increase opportunities available for channel measurements, or streamline beam tracking. In another aspect of directional DRS, the DRS may be transmitted following one or more procedures initiated by the UE 115. For example, in some cases, the UE 115 may transmit a scheduling request (SR) to the base station 105-*a* requesting one or more reference signals for measurements or beam tracking. In such cases, the base station 105-*a* may transmit the directional DRS beam within a variable time window after receiving the SR from the UE 115.

In some cases, the UE 115 may perform its initial cell search based on a multi-beam DRS, an opportunistic DRS, or a combination. As previously described, a multi-beam DRS may utilize a fixed location in time to transmit DRS or may be transmitted within a fixed window based upon a successful LBT. An opportunistic DRS may utilize a floating time window, which in some cases may be pre-designated for transmission of DRS. Timing acquisition may be complex or uncertain under the opportunistic DRS scheme due to the floating timing window during which DRS is transmitted.

In some examples, a subframe offset and type of DRS (multi-beam or opportunistic) may be signaled in the DRS (e.g., via the PBCH). In some cases, the subframe offset may provide an indication of the subframe that includes the DRS. For a multi-beam DRS, the offset may be set to zero, whereas an opportunistic DRS may be indicated using a non-zero value. In some cases, the subframe offset may correspond to a subframe offset of each SS block from a set of SS blocks. Additionally or alternatively, the subframe offset may correspond to a subframe offset of the first instance of an SS block from a set of repeated SS blocks.

In some cases, the multi-beam DRS and opportunistic DRS may utilize a similar or identical DRS structure, which may ease processing at the UE 115. Maintaining the same DRS structure may also serve to maximize chances of the UE 115 acquiring PSS, and resolving timing uncertainty. In a simple example of this scheme, if a DRS is expected within a floating window of W milliseconds (ms), but actually transmitted at V ms, the DRS may indicate a value of V ms. Furthermore, in some cases, an indication of the type of DRS may also provide the UE 115 additional information about the presence of one or more corresponding RACH opportunities.

In some cases, timing uncertainties may be associated with the repeated transmission of SS blocks within one or more SS bursts, the SS repetitions pointing to one or more multi-beam RACH opportunities. A DRS may include repetitions of sets of SS blocks within an SS burst, and distinguishing between different SS repetitions is important to resolving timing ambiguity. To do so, cyclic codes may be used to distinguish between different SS blocks, while keeping the same PBCH payload across different SS repetitions. In some cases, cyclic codes may include codewords that are cyclically shifted with respect to one another. Thus, codewords using different cyclic shifts may be used for the same payload of PBCH transmissions on multiple repetitions of an SS block. In some cases, the amount of cyclic shift applied to or used for each repetition may determine the SS block index for each of the multiple repetitions. In some other cases, multiple SS blocks spaced out in time and transmitted in the same direction may explicitly indicate a common SFN or subframe (SF) combination in the PBCH for RACH. In such cases, the PBCH payload may differ across SS repetitions. Furthermore, in some cases, additional physical layer signaling such as unique signatures embedded in the PSS or SSS, or any other physical layer signaling, may be introduced within each SS block in the DRS and used to indicate the SS block index for each of the multiple repetitions. In some other cases, cyclically rotated versions of the PSS or SSS, or the use of a cyclic shift between the PSS and SS may also be used to indicate the SS block index for each of the multiple repetitions.

In some cases, implementations of the above solutions to reduce timing uncertainties may be used in a RACH procedure between the base station 105-*a* and the UE 115, as further described with reference to FIG. 3. For instance, the UE 115 may listen or monitor for a DRS (either opportunistic or multi-beam) transmitted over multiple beamformed signals 205 and may determine one or more RACH opportunities, which may be indicated in one or both of opportunistic and multi-beam DRS transmissions.

Figure 3:
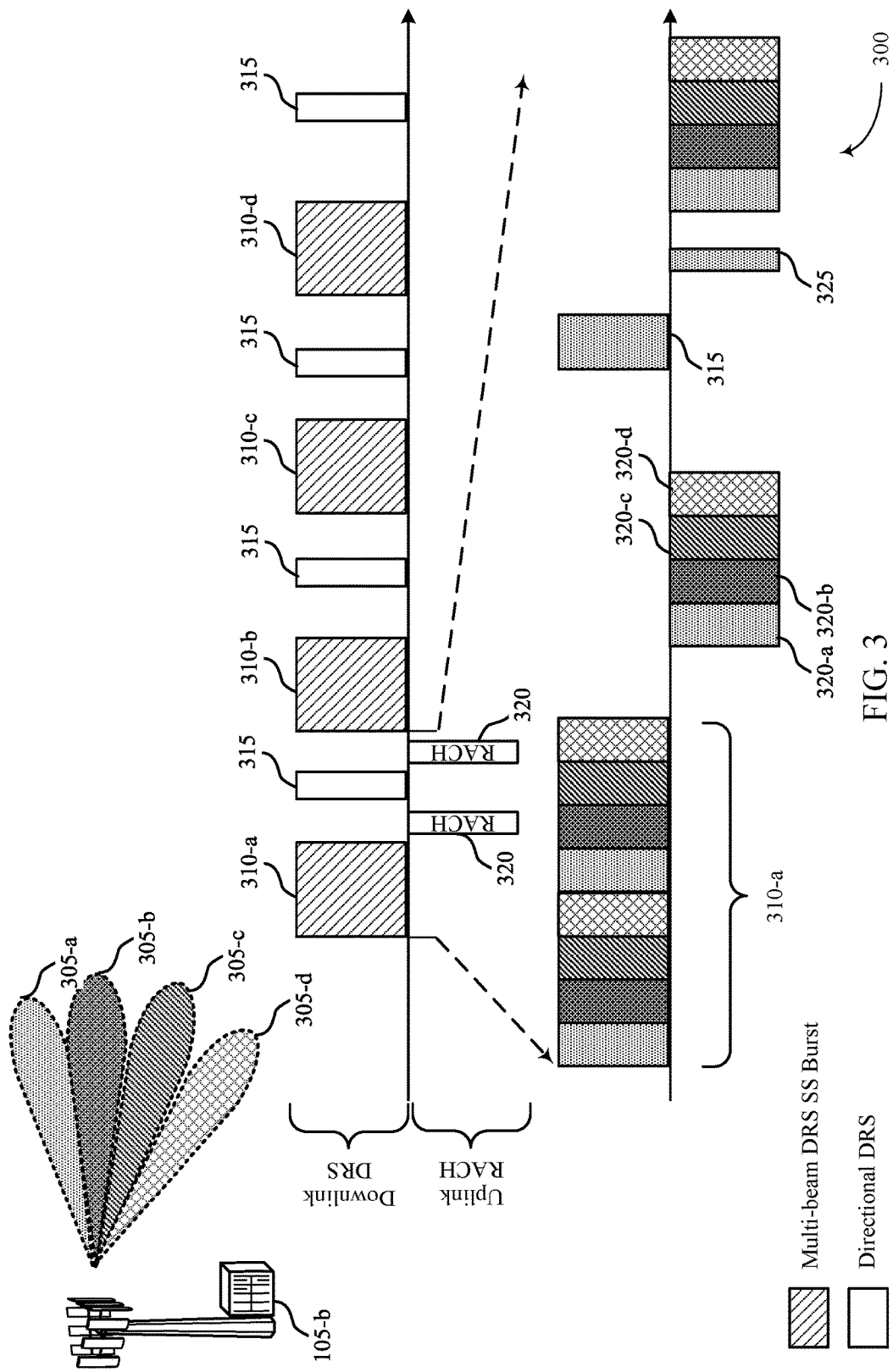
FIG. 3 illustrates an example of a process that supports discovery and random access for shared spectrum in accordance with aspects of the present disclosure.

FIG. 3 illustrates an example of a process 300 that supports discovery and random access for shared spectrum in accordance with aspects of the present disclosure. The process 300 may include one or more beamformed signals 305 (e.g., beamformed signal 305-a, beamformed signal 305-b, beamformed signal 305-c, and beamformed signal 305-d) transmitted by a base station 105-b, which may be an example of the base station 105 described with reference to FIGS. 1 and 2.

In some cases, a multi-beam DRS transmission may include repeated transmissions of SS blocks, each SS block transmitted over a single beamformed signal 305, and within one or more SS bursts 310 (e.g., SS burst 310-a, SS burst 310-b, SS burst 310-c, and SS burst 310-d). In some examples, the SS block repetitions may point to or indicate one or more multi-beam RACH opportunities 320 (e.g., RACH opportunity 320-a, RACH opportunity 320-b, RACH opportunity 320-c, RACH opportunity 320-d) for one or more UEs.

In some cases, multi-beam RACH opportunities 320 may be indicated in a DRS via the PBCH, or minimum SIB, or a combination. In some instances, an SS block corresponding to a single beamformed signal 305 may map to one or more multi-beam RACH locations within an inter-DRS interval. In some cases, the inter-DRS interval may be defined as the duration between adjacent SS bursts 310, for example SS burst 310-a and SS burst 310-b. Furthermore, following indication of a RACH opportunity 320 (e.g., RACH opportunity 320-a) to the UE 115, the base station 105-b may monitor or listen during a duration corresponding to the indicated RACH opportunity 320. In some cases, the configuration corresponding to the RACH opportunity 320 may indicate one or more of a UE cyclic shift, frequency resources available for the UE, an SS block index, a Walsh code, an orthogonal cover code (OCC) index, etc.

In some other cases, the base station 105-b may also pseudo-periodically transmit opportunistic DRS transmissions 315. These opportunistic DRS transmissions 315 may be contingent on a free channel or medium availability, and may indicate a RACH opportunity 320 (e.g., RACH opportunity 320-e) available for the UE 115, which may be in addition to one or more RACH opportunities 320 from the multi-beam DRS. For example, in some cases, an opportunistic DRS transmission 315 may indicate its own RACH opportunity 320-e. In such cases, the base station 105-b may reserve the channel for the UE to transmit RACH 325, thus enabling the UE 115 to transmit RACH contention free. In an alternate scheme, the directional DRS transmission 315 may map to a pre-configured multi-beam RACH opportunity 320 (e.g., RACH opportunity 320-a, or RACH opportunity 320-b). In such cases, the RACH resource information included in the opportunistic DRS transmission 315 may comprise the UE cyclic shift, UE frequency resources, SS block index, Walsh codes, OCC indices, etc.

In some cases, in addition to RACH indications, the DRS may include one or more beam reference signals for the UE 115 to use for measurements, beam tracking, etc. Thus, while a first UE 115 may utilize the DRS for measurement or tracking purposes, a second UE 115 may use the same DRS to detect a RACH opportunity. In such cases, the above described techniques utilizing a reserved medium, or pre-configured RACH locations may be deployed to prevent interference between the two UEs 115.

Figure 4:
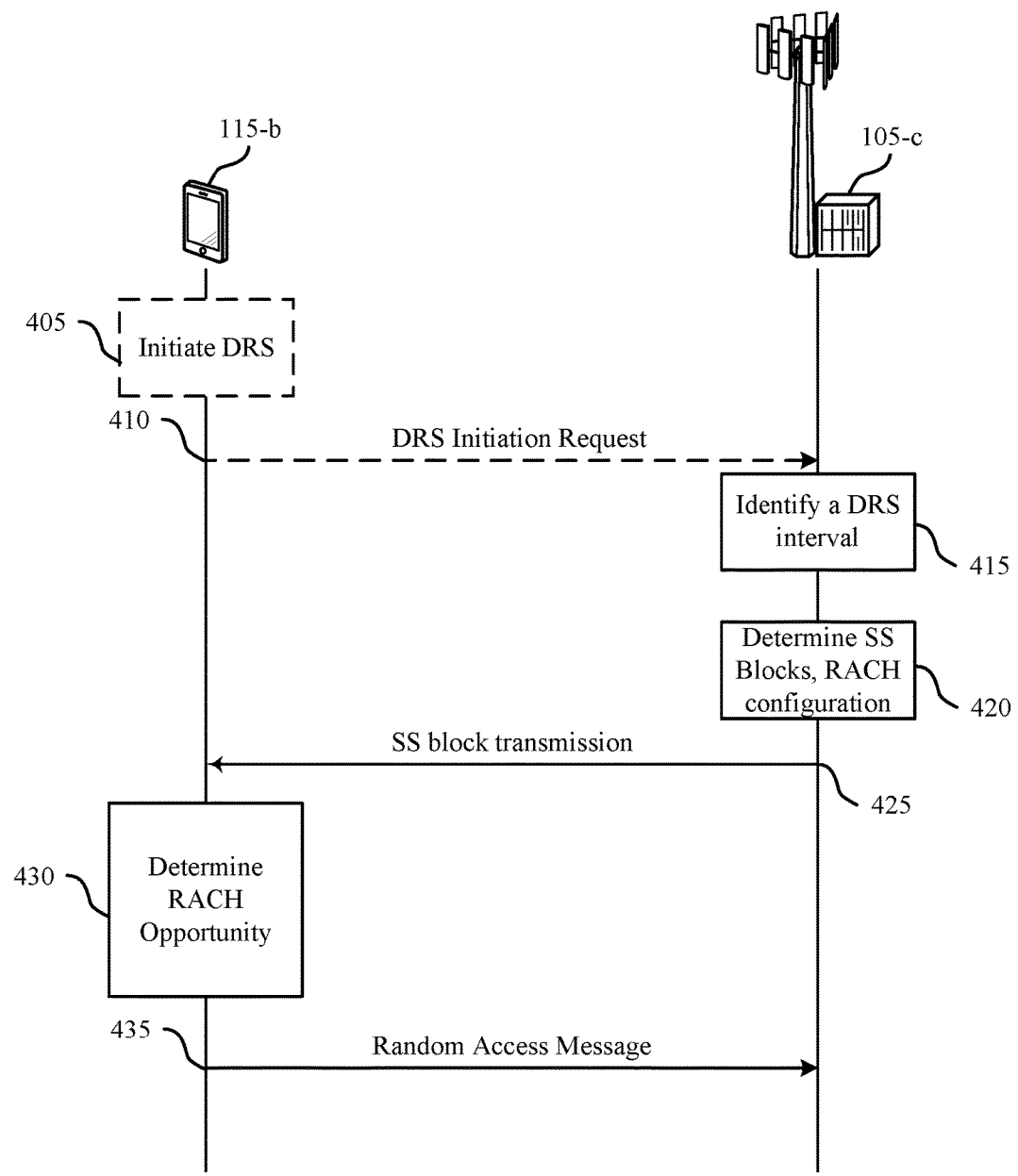
FIG. 4 illustrates an example of a process flow that supports discovery and random access for shared spectrum in accordance with aspects of the present disclosure.

FIG. 4 illustrates an example of a process flow 400 that supports discovery and random access for shared spectrum in accordance with aspects of the present disclosure. The process illustrated by process flow 400 may be implemented by a UE 115-b and a base station 105-c, which may be examples of a UE 115 and base station 105 described herein.

In some examples, the process flow 400 illustrated in FIG. 4 may be implemented in a wireless system operating in mmW spectrum.

In some cases, at 405, UE 115-b may determine a DRS interval for a DRS reception over a shared radio frequency spectrum band, and initiate a DRS request process. For example, the UE 115-b may prepare an SR for transmission to the base station 105-c, requesting one or more reference signals for beam tracking, measurement, or to acquire timing. In some other cases, the UE 115-b may initiate the DRS request process to perform an initial cell search.

At 410, the UE 115-b may transmit a DRS initiation request to the base station 105-c. In some cases, the DRS initiation request may form a subset of an SR, or another uplink transmission from the UE. Alternatively, in some cases, the UE 115-b may not initiate DRS and may instead listen during predetermined intervals for a multi-beam DRS or an opportunistic DRS.

At 415, the base station 105-c may identify a DRS interval for a DRS transmission over a shared frequency spectrum band. In some cases, the base station 105-c may identify the DRS interval based on a DRS initiation request, as may have been received from the UE 115-b at 410. In some other cases, the base station may not receive a DRS initiation request from the UE 115-b, and may proceed to identify a DRS interval based one or more transmission beams, channel quality, medium availability, etc.

At 420, the base station 105-c may proceed to determine one or more SS blocks based in part on the one or more transmission beams, as well as a RACH configuration for each of the identified SS blocks.

At 425, the base station 105-c may transmit to the UE 115-b, over the shared frequency spectrum band, the set of SS blocks identified at 420 using the one or more transmission beams. In some cases, transmitting the SS blocks using the one or more transmission beams may further include repeating a subset of the set of SS blocks within an SS burst, where at least one SS block of the subset indicates a random access opportunity for the UE 115-b. Furthermore, in some cases, one or more SS blocks of the subset of SS blocks may indicate a subframe offset.

At 430, the UE 115-b may receive during the DRS interval, one or more SS blocks indicating one or more random access configurations. Furthermore, the UE 115-b may determine one or more RACH opportunities based on the indices of the received SS blocks or random access configuration.

At 435, the UE 115-b may transmit a random access message to the base station 105-c at or during an identified RACH opportunity.

Figure 5:
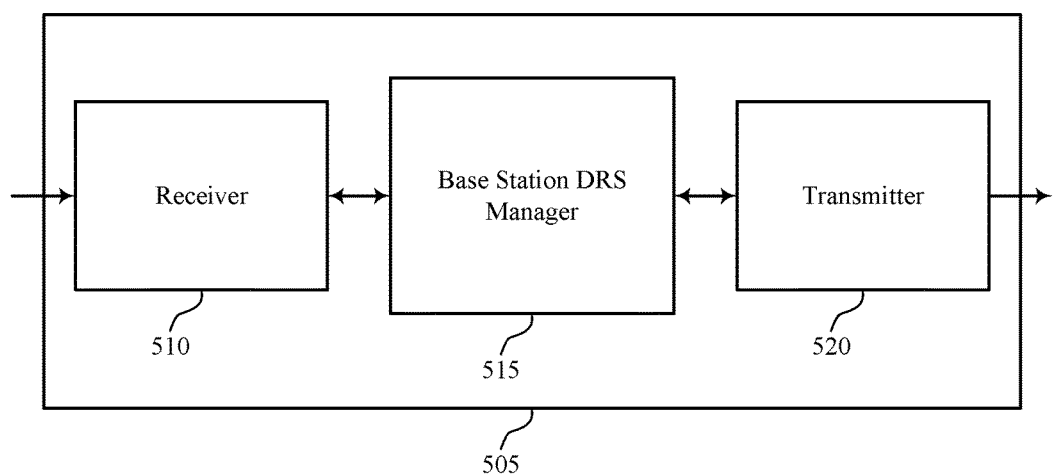
FIGS. 5 and 6 show block diagrams of wireless devices that support discovery and random access for shared spectrum in accordance with aspects of the present disclosure.

FIG. 5 shows a block diagram 500 of a wireless device 505 that supports discovery and random access for shared spectrum in accordance with aspects of the present disclosure. Wireless device 505 may be an example of aspects of a base station 105 as described with reference to FIGS. 1 through 4. Wireless device 505 may include receiver 510, base station DRS manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to discovery and random access for shared spectrum, etc.). Information may be passed on to other components of the device. The receiver 510 may be an example of aspects of the transceiver 835 described with reference to FIG. 8.

Base station DRS manager 515 may be an example of aspects of the base station DRS manager 815 described with reference to FIG. 8. Base station DRS manager 515 and/or at least some of its various sub-components may be implemented in hardware, software executed by a processor, firmware, or any combination thereof. If implemented in software executed by a processor, the functions of the base station DRS manager 515 and/or at least some of its various sub-components may be executed by a general-purpose processor, a digital signal processor (DSP), an application-specific integrated circuit (ASIC), an field-programmable gate array (FPGA) or other programmable device, discrete gate or transistor logic, discrete hardware components, or any combination thereof designed to perform the functions described in the present disclosure.

The base station DRS manager 515 and/or at least some of its various sub-components may be physically located at various positions, including being distributed such that portions of functions are implemented at different physical locations by one or more physical devices. In some examples, base station DRS manager 515 and/or at least some of its various sub-components may be a separate and distinct component in accordance with various aspects of the present disclosure. In other examples, base station DRS manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station DRS manager 515 may determine a DRS interval for transmission of a DRS over a shared radio frequency spectrum band and determine a set of SS blocks for transmission of the DRS based on a set of transmission beams, where each SS block of the set of SS blocks indicates a random access configuration. Base station DRS manager 515 may transmit, over the shared radio frequency spectrum band, the set of SS blocks during the DRS interval using one or more transmission beams of the set of transmission beams. In some cases, the base station DRS manager 515 may receive, from a first UE, a random access message during the DRS interval based on the random access configuration for at least one SS block of the set of SS blocks.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
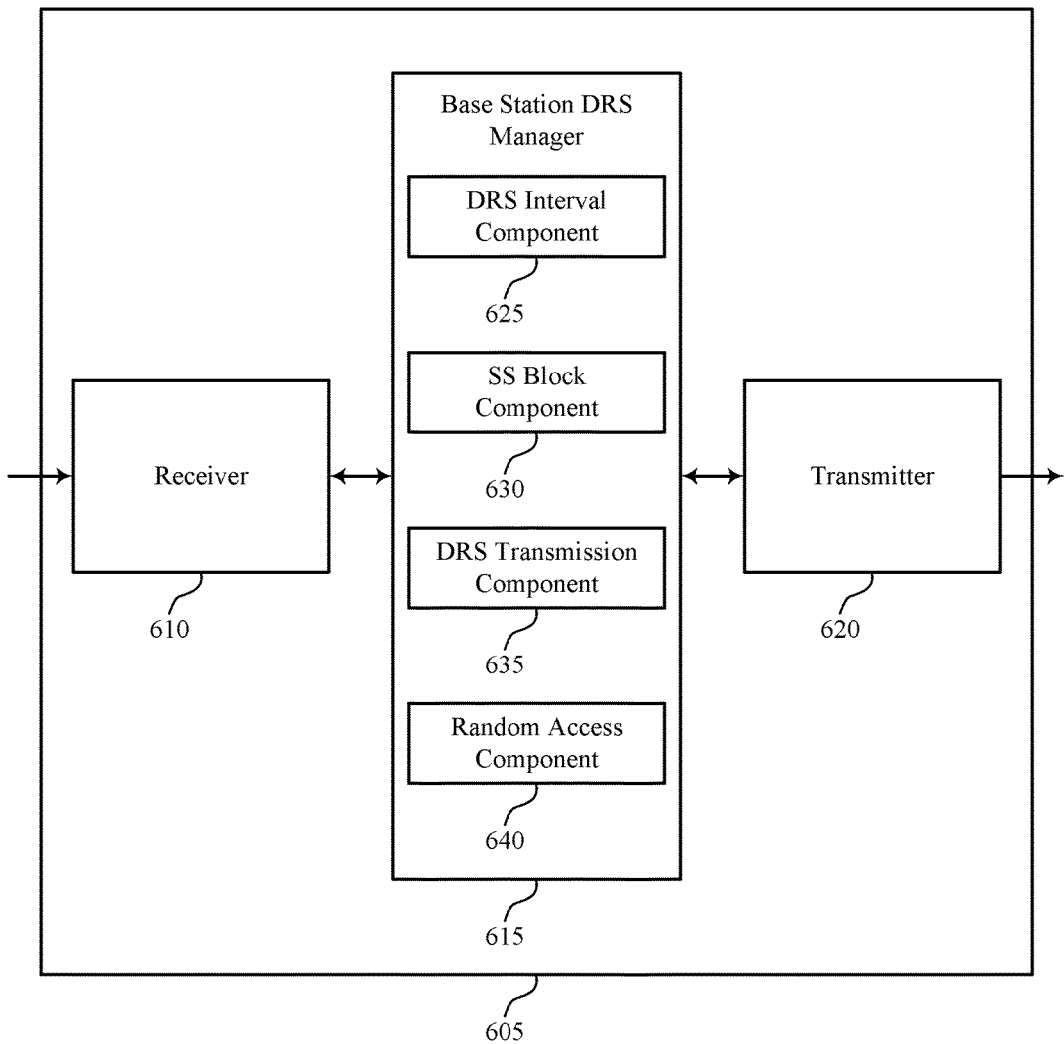

FIG. 6 shows a block diagram 600 of a wireless device 605 that supports discovery and random access for shared spectrum in accordance with aspects of the present disclosure. Wireless device 605 may be an example of aspects of a wireless device 505 or a base station 105 as described with reference to FIGS. 1 through 5. Wireless device 605 may include receiver 610, base station DRS manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to discovery and random access for shared spectrum, etc.). Information may be passed on to other components of the device. The receiver 610 may be an example of aspects of the transceiver 835 described with reference to FIG. 8.

Base station DRS manager 615 may be an example of aspects of the base station DRS manager 815 described with reference to FIG. 8. Base station DRS manager 615 may also include DRS interval component 625, SS block component 630, DRS transmission component 635, and random access component 640.

DRS interval component 625 may determine a DRS interval for transmission of a DRS over a shared radio frequency spectrum band.

SS block component 630 may determine a set of SS blocks for transmission of the DRS based on a set of transmission beams, where each SS block of the set of SS blocks indicates a random access configuration. In some cases, at least one SS block indicates the random access opportunity in both an initial transmission and a subsequent transmission. In some examples, a first SS block of the subset of SS blocks indicates a first random access opportunity and a second block of the subset of SS blocks indicates a second random access opportunity different from the first random access opportunity. In some aspects, an SS block of the subset of SS blocks in an initial transmission includes a different cyclical shift for a first PBCH transmitted within the SS block from a second PBCH transmitted within a corresponding SS block in a subsequent transmission.

In some instances, an SS block of the subset of SS blocks in an initial transmission includes a first physical broadcast channel PBCH payload that is different from a second PBCH payload of a corresponding SS block in a subsequent transmission. In some cases, a payload difference between the first PBCH payload and the second PBCH payload is based on a first index associated with the SS block of the subset of SS blocks in the initial transmission and a second index associated with the corresponding SS block in the subsequent transmission. In some examples, at least one of the determined set of SS blocks indicates a subframe offset. In some aspects, an index of each SS block in the set of SS blocks maps to multiple random access opportunities within the DRS interval.

DRS transmission component 635 may transmit, over the shared radio frequency spectrum band, the set of SS blocks during the DRS interval using one or more transmission beams of the set of transmission beams. In some cases, DRS transmission component 635 may transmit an opportunistic DRS based on a received DRS initiation request, where the transmission of the opportunistic DRS may occur within a fixed timing offset after receiving the DRS initiation request. In some examples, DRS transmission component 635 may transmit the opportunistic DRS concurrently with a control channel or a shared channel over at least one transmission beam of the set of transmission beams and transmit each SS block of the set of SS blocks over a corresponding transmission beam of the set of transmission beams.

In some aspects, the opportunistic DRS is transmitted to one or both of the first UE or a second UE different from the first UE. In some instances, transmitting the set of SS blocks during the DRS interval includes: repeating a subset of SS blocks of the set of SS blocks within an SS burst, where at least one SS block within the subset of SS blocks indicates a random access opportunity. In some cases, the DRS includes an indication of a DRS type. In some examples, a PBCH of the DRS includes the indication and the DRS type including one of a multi-beam DRS or an opportunistic DRS.

Random access component 640 may receive, from a first UE, a random access message during the DRS interval based on the random access configuration for at least one SS block of the set of SS blocks. In some cases, the random access configuration indicates at least one of a cyclic shift for a UE, a frequency resource for the UE, an SS block index, a Walsh code index, an OCC index, or any combination thereof.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
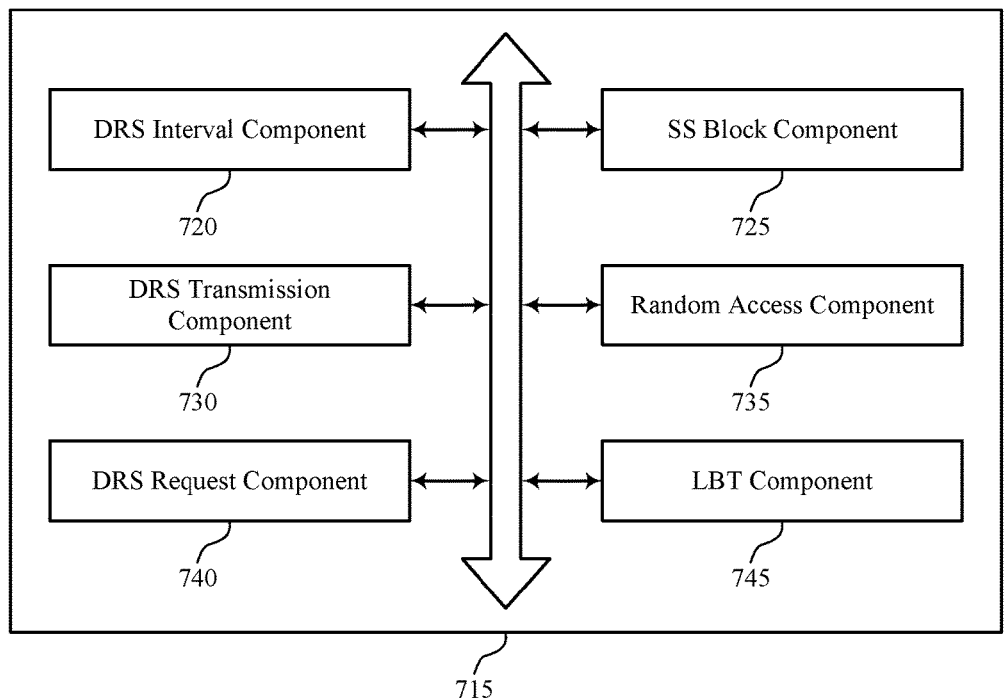
FIG. 7 shows a block diagram of a base station discovery reference signal (DRS) manager that supports discovery and random access for shared spectrum in accordance with aspects of the present disclosure.

FIG. 7 shows a block diagram 700 of a base station DRS manager 715 that supports discovery and random access for shared spectrum in accordance with aspects of the present disclosure. The base station DRS manager 715 may be an example of aspects of a base station DRS manager 515, a base station DRS manager 615, or a base station DRS manager 815 described with reference to FIGS. 5 through 6 and 8. The base station DRS manager 715 may include DRS interval component 720, SS block component 725, DRS transmission component 730, random access component 735, DRS request component 740, and LBT component 745. Each of these modules may communicate, directly or indirectly, with one another (e.g., via one or more buses).

DRS interval component 720 may determine a DRS interval for transmission of a DRS over a shared radio frequency spectrum band.

SS block component 725 may determine a set of SS blocks for transmission of the DRS based on a set of transmission beams, where each SS block of the set of SS blocks indicates a random access configuration. In some cases, at least one SS block indicates the random access opportunity in both an initial transmission and a subsequent transmission. In some examples, a first SS block of the subset of SS blocks indicates a first random access opportunity and a second block of the subset of SS blocks indicates a second random access opportunity different from the first random access opportunity. In some aspects, an SS block of the subset of SS blocks in an initial transmission includes a different cyclical shift for a first PBCH transmitted within the SS block from a second PBCH transmitted within a corresponding SS block in a subsequent transmission. In some instances, an SS block of the subset of SS blocks in an initial transmission includes a different cyclical shift for a first synchronization signal transmitted within the SS block from a second synchronization signal transmitted within a corresponding SS block in a subsequent transmission. In some cases, the first and second synchronization signals may be a PSS or an SSS.

In some examples, an SS block of the subset of SS blocks in an initial transmission includes a first PBCH payload that is different from a second PBCH payload of a corresponding SS block in a subsequent transmission, where the payload difference between the first PBCH payload and the second PBCH payload is based on a first index associated with the SS block of the subset of SS blocks in an initial transmission and a second index associated with the corresponding SS block in the subsequent transmission. In some aspects, at least one of the determined set of SS blocks indicates a subframe offset. In some instances, an index of each SS block in the set of SS blocks maps to multiple random access opportunities within the DRS interval.

DRS transmission component 730 may transmit, over the shared radio frequency spectrum band, the set of SS blocks during the DRS interval using one or more transmission beams of the set of transmission beams. In some cases, DRS transmission component 730 may transmit an opportunistic DRS based on the received DRS initiation request, where the transmission of the opportunistic DRS may occur within a fixed timing offset after receiving the DRS initiation request. In some aspects, DRS transmission component 730 may transmit the opportunistic DRS concurrently with a control channel or a shared channel over at least one transmission beam of the set of transmission beams and transmit each SS block of the set of SS blocks over a corresponding transmission beam of the set of transmission beams.

In some examples, the opportunistic DRS is transmitted to one or both of the first UE or a second UE different from the first UE. In some instances, transmitting the set of SS blocks during the DRS interval includes: repeating a subset of SS blocks of the set of SS blocks within an SS burst, where at least one SS block within the subset of SS blocks indicates a random access opportunity. In some cases, the DRS includes an indication of a DRS type. In some examples, a PBCH of the DRS includes the indication and the DRS type including one of a multi-beam DRS or an opportunistic DRS.

Random access component 735 may receive, from a first UE, a random access message during the DRS interval based on the random access configuration for at least one SS block of the set of SS blocks. In some cases, the random access configuration indicates at least one of a cyclic shift for a UE, a frequency resource for the UE, an SS block index, a Walsh code index, an OCC index, or any combination thereof.

DRS request component 740 may receive a DRS initiation request from the first UE. LBT component 745 may perform an LBT procedure for the DRS prior to transmitting at least one SS block in the set of SS blocks.

Figure 8:
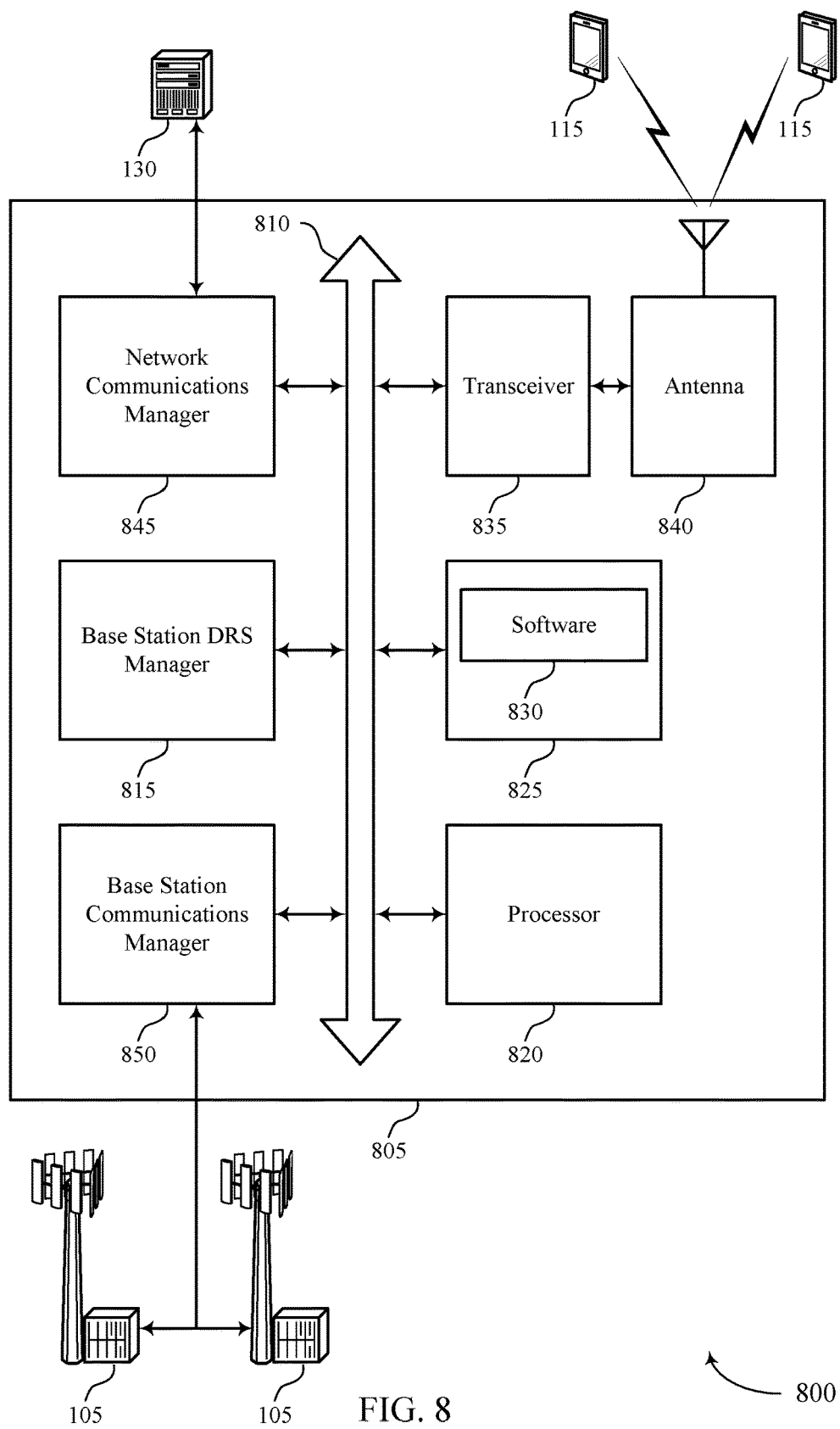
FIG. 8 illustrates a block diagram of a system including a device that supports discovery and random access for shared spectrum in accordance with aspects of the present disclosure.

FIG. 8 shows a block diagram of a system 800 including a device 805 that supports discovery and random access for shared spectrum in accordance with aspects of the present disclosure. Device 805 may be an example of or include the components of wireless device 505, wireless device 605, or a base station 105 as described with reference to, for example, FIGS. 1 through 6. Device 805 may include components for bi-directional voice and data communications including components for transmitting and receiving communications, including base station DRS manager 815, processor 820, memory 825, software 830, transceiver 835, antenna 840, network communications manager 845, and base station communications manager 850. These components may be in electronic communication via one or more busses (e.g., bus 810). Device 805 may communicate wirelessly with one or more UEs 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting discovery and random access for shared spectrum).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support discovery and random access for shared spectrum. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Base station communications manager 850 may manage communications with other base station 105, and may include a controller or scheduler for controlling communications with UEs 115 in cooperation with other base stations 105. For example, the base station communications manager 850 may coordinate scheduling for transmissions to UEs 115 for various interference mitigation techniques such as beamforming or joint transmission. In some cases, base station communications manager 850 may provide an X2 interface within an LTE/LTE-A wireless communication network technology to provide communication between base stations 105.

Figure 9:
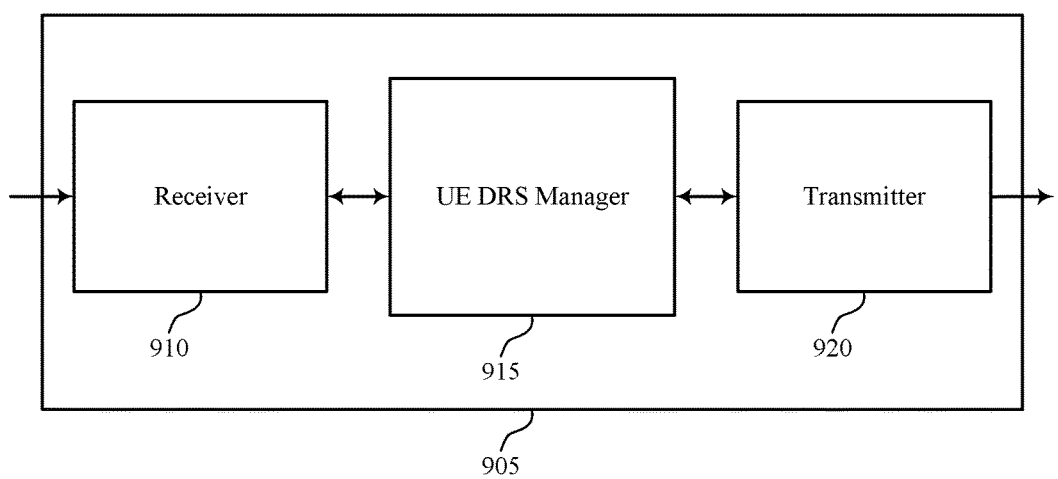
FIGS. 9 and 10 show block diagrams of wireless devices that support discovery and random access for shared spectrum in accordance with aspects of the present disclosure.

FIG. 9 shows a block diagram 900 of a wireless device 905 that supports discovery and random access for shared spectrum in accordance with aspects of the present disclosure. Wireless device 905 may be an example of aspects of a UE 115 as described with reference to FIGS. 1, 2, and 4. Wireless device 905 may include receiver 910, UE DRS manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to discovery and random access for shared spectrum, etc.). Information may be passed on to other components of the device. The receiver 910 may be an example of aspects of the transceiver 1235 described with reference to FIG. 12.

UE DRS manager 915 may be an example of aspects of the UE DRS manager 1215 described with reference to FIG. 12. UE DRS manager 915 and/or at least some of its various sub-components may be implemented in hardware, software executed by a processor, firmware, or any combination thereof. If implemented in software executed by a processor, the functions of the UE DRS manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE DRS manager 915 and/or at least some of its various sub-components may be physically located at various positions, including being distributed such that portions of functions are implemented at different physical locations by one or more physical devices. In some examples, UE DRS manager 915 and/or at least some of its various sub-components may be a separate and distinct component in accordance with various aspects of the present disclosure. In other examples, UE DRS manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE DRS manager 915 may determine a DRS interval for reception of a DRS over a shared radio frequency spectrum band and receive, during the DRS interval, a SS block indicating a random access configuration. UE DRS manager 915 may determine a random access opportunity based on the random access configuration and transmit, to a base station, a random access request message during the random access opportunity.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
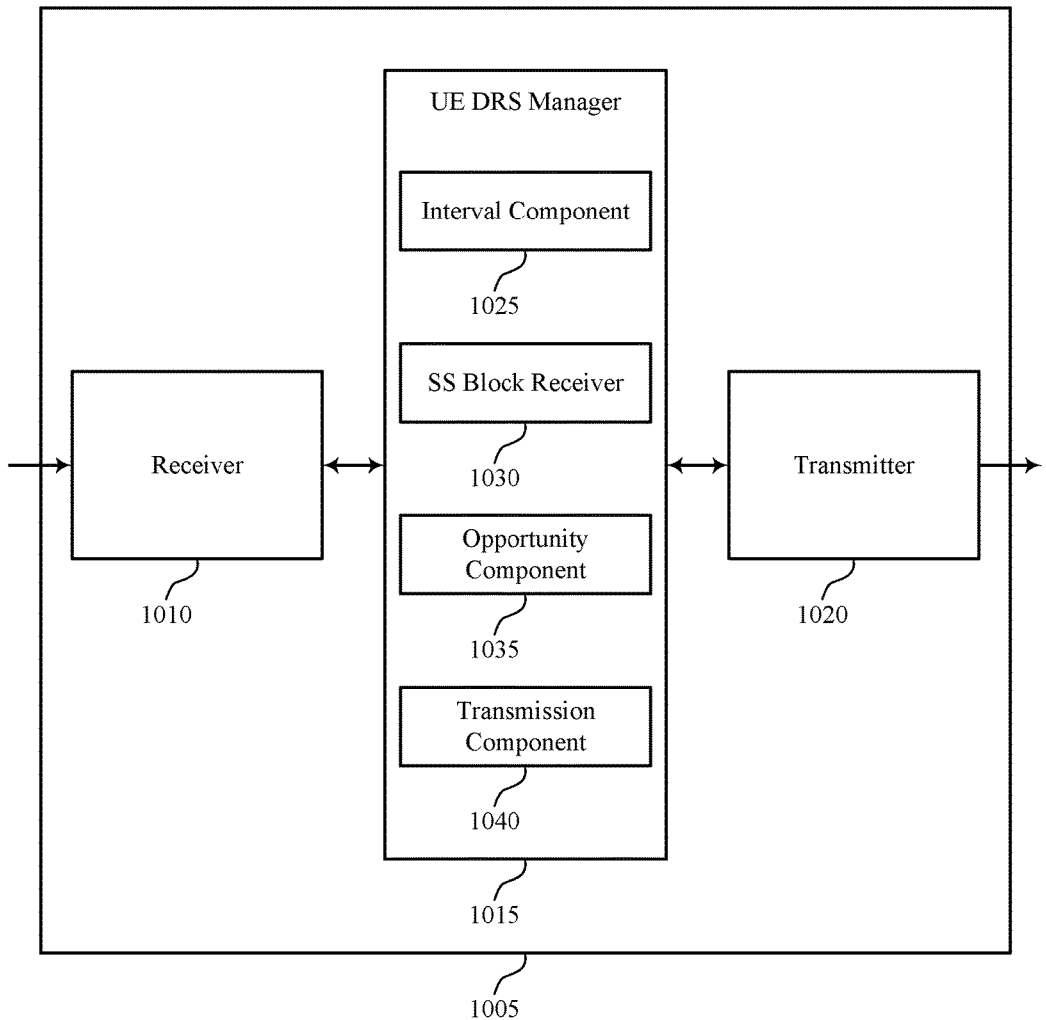

FIG. 10 shows a block diagram 1000 of a wireless device 1005 that supports discovery and random access for shared spectrum in accordance with aspects of the present disclosure. Wireless device 1005 may be an example of aspects of a wireless device 905 or a UE 115 as described with reference to FIGS. 1, 2, 4, and 9. Wireless device 1005 may include receiver 1010, UE DRS manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to discovery and random access for shared spectrum, etc.). Information may be passed on to other components of the device. The receiver 1010 may be an example of aspects of the transceiver 1235 described with reference to FIG. 12.

UE DRS manager 1015 may be an example of aspects of the UE DRS manager 1215 described with reference to FIG. 12. UE DRS manager 1015 may also include interval component 1025, SS block receiver 1030, opportunity component 1035, and transmission component 1040.

Interval component 1025 may determine a DRS interval for reception of a DRS over a shared radio frequency spectrum band.

SS block receiver 1030 may receive, during the DRS interval, a synchronization SS block indicating a random access configuration and receive, during the DRS interval, multiple repetitions of a set of SS blocks within an SS burst, where at least one SS block within the set of SS blocks indicates one or more random access opportunities. In some cases, an SS block index or a PBCH within the DRS includes an indication of a DRS type.

Opportunity component 1035 may determine a random access opportunity based on the random access configuration and determine multiple random access opportunities based on an index of the received SS block.

Transmission component 1040 may transmit, to a base station, a random access request message during the random access opportunity and transmit a DRS initiation request to the base station.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
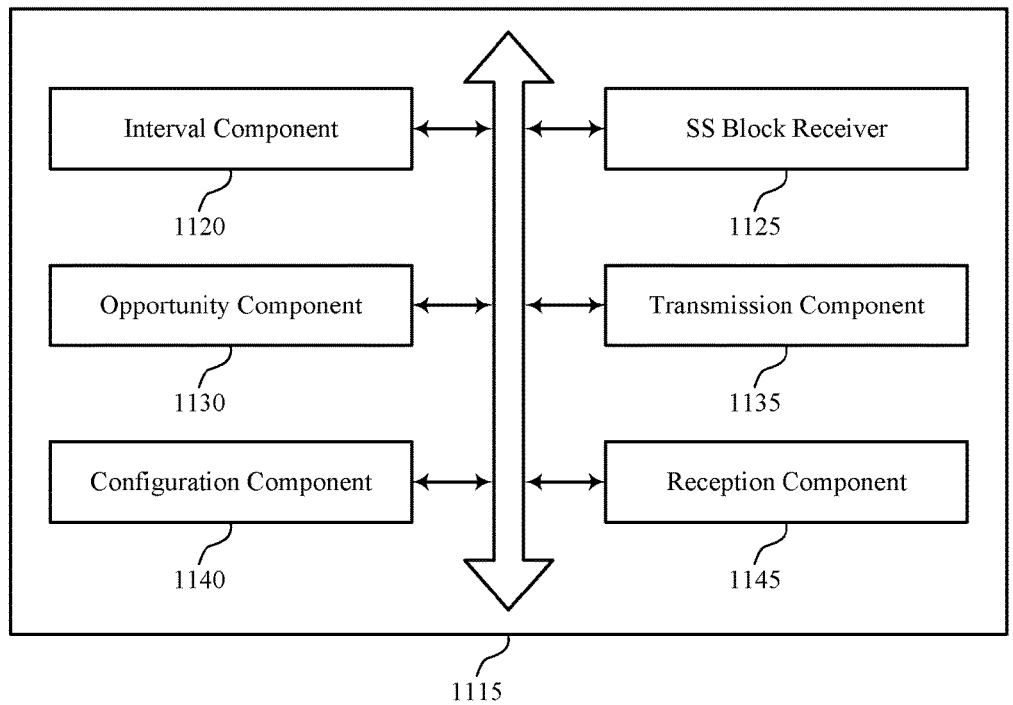
FIG. 11 shows a block diagram of a user equipment (UE) DRS manager that supports discovery and random access for shared spectrum in accordance with aspects of the present disclosure.

FIG. 11 shows a block diagram 1100 of a UE DRS manager 1115 that support discovery and random access for shared spectrum in accordance with aspects of the present disclosure. The UE DRS manager 1115 may be an example of aspects of a UE DRS manager 1215 described with reference to FIGS. 9 through 10 and 12. The UE DRS manager 1115 may include interval component 1120, SS block receiver 1125, opportunity component 1130, transmission component 1135, configuration component 1140, and reception component 1145. Each of these modules may communicate, directly or indirectly, with one another (e.g., via one or more buses).

Interval component 1120 may determine a DRS interval for reception of a DRS over a shared radio frequency spectrum band.

SS block receiver 1125 may receive, during the DRS interval, a SS block indicating a random access configuration and receive, during the DRS interval, multiple repetitions of a set of SS blocks within an SS burst, where at least one SS block within the set of SS blocks indicates one or more random access opportunities. In some cases, an SS block index or a PBCH within the DRS includes an indication of a DRS type.

Opportunity component 1130 may determine a random access opportunity based on the random access configuration and determine multiple random access opportunities based on an index of the received SS block.

Transmission component 1135 may transmit, to a base station, a random access request message during the random access opportunity and transmit a DRS initiation request to the base station.

Configuration component 1140 may determine, based on the random access configuration, at least one of a cyclic shift for a UE, a frequency resource for the UE, an SS block index, a Walsh code index, an OCC index, or any combination thereof.

Reception component 1145 may receive an opportunistic DRS based on the DRS initiation request.

Figure 12:
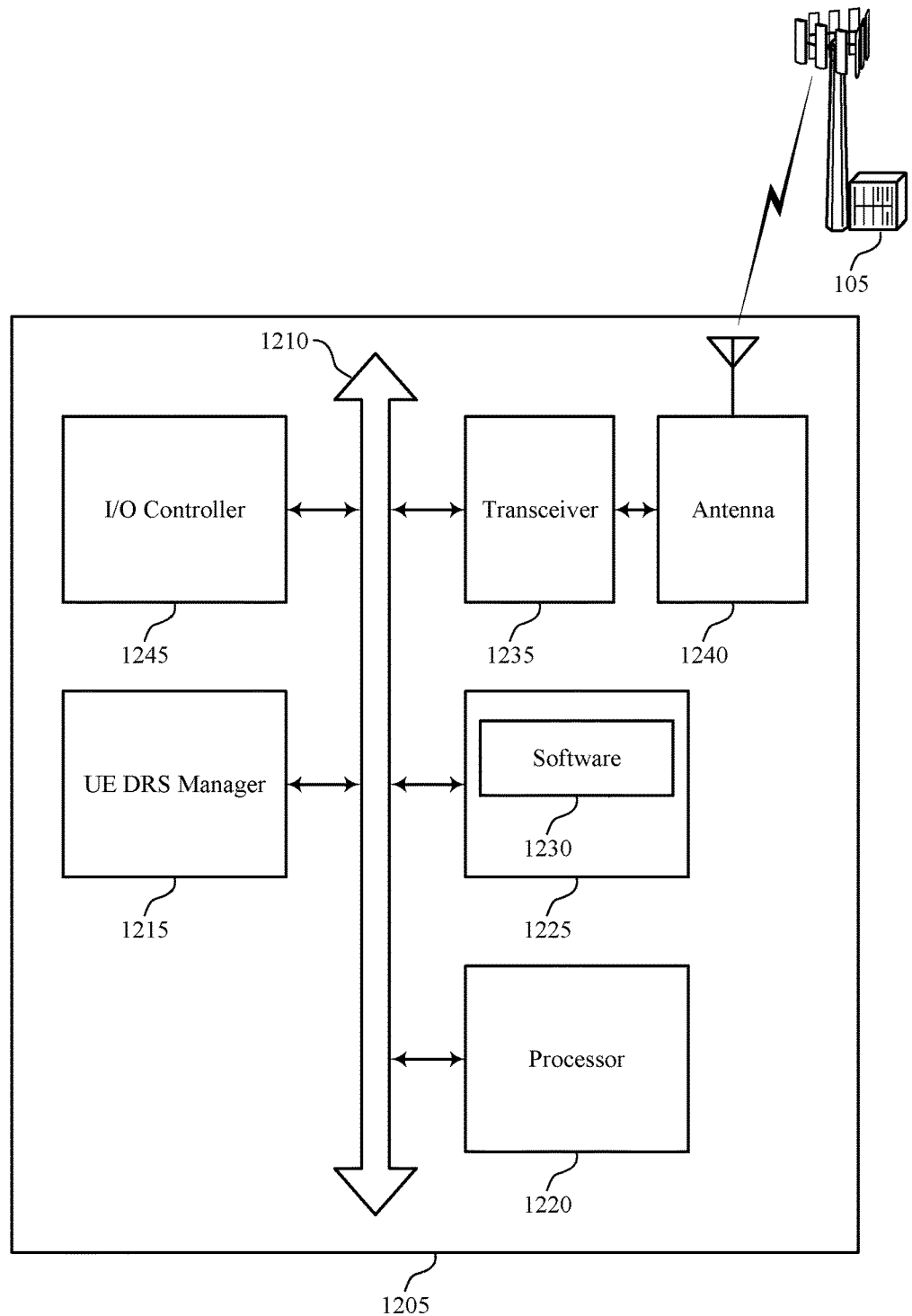
FIG. 12 illustrates a block diagram of a system including a device that supports discovery and random access for shared spectrum in accordance with aspects of the present disclosure.

FIG. 12 illustrates a block diagram of a system 1200 including a device 1205 that supports discovery and random access for shared spectrum in accordance with aspects of the present disclosure. Device 1205 may be an example of or include the components of UE 115 as described, for example, with reference to FIGS. 1, 2, 4, 9, and 10. Device 1205 may include components for bi-directional voice and data communications including components for transmitting and receiving communications, including UE DRS manager 1215, processor 1220, memory 1225, software 1230, transceiver 1235, antenna 1240, and I/O controller 1245. These components may be in electronic communication via one or more busses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting discovery and random access for shared spectrum).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support discovery and random access for shared spectrum. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
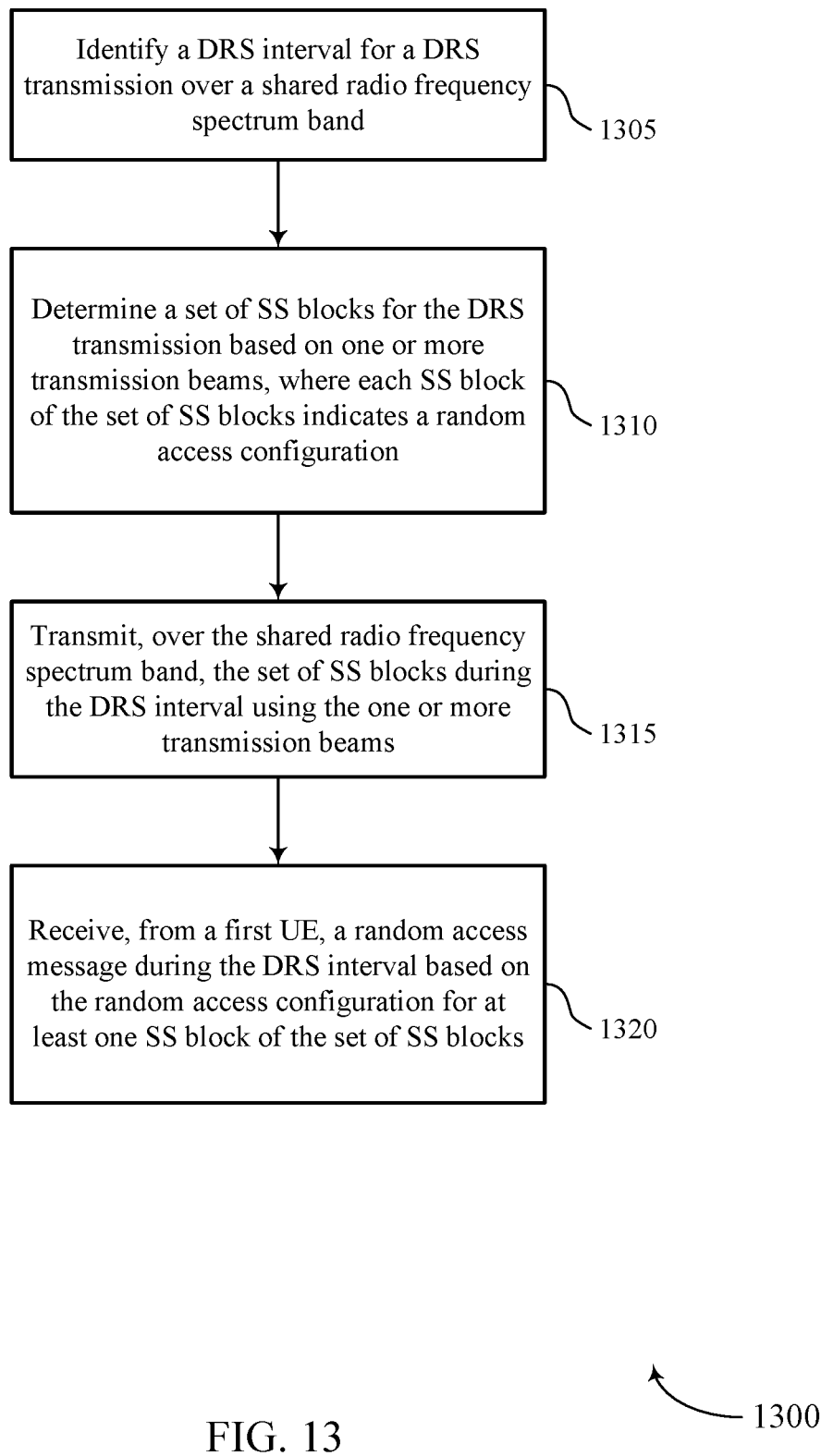
FIGS. 13 and 14 show flowcharts illustrating methods for discovery and random access for shared spectrum in accordance with aspects of the present disclosure.

FIG. 13 shows a flowchart illustrating a method 1300 for discovery and random access for shared spectrum in accordance with aspects of the present disclosure. The operations of method 1300 may be implemented by a base station 105 or its components as described herein. For example, the operations of method 1300 may be performed by a base station DRS manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1305, the base station 105 may determine a DRS interval for transmission of a DRS over a shared radio frequency spectrum band. The operations of block 1305 may be performed according to the methods described with reference to FIGS. 1 through 4. In certain examples, aspects of the operations of block 1305 may be performed by a DRS interval component as described with reference to FIGS. 5 through 8.

At block 1310, the base station 105 may determine a set of SS blocks for transmission of the DRS on a set of transmission beams, wherein each SS block of the set of SS blocks indicates a random access configuration. The operations of block 1310 may be performed according to the methods described with reference to FIGS. 1 through 4. In certain examples, aspects of the operations of block 1310 may be performed by a SS block component as described with reference to FIGS. 5 through 8.

At block 1315, the base station 105 may transmit, over the shared radio frequency spectrum band, the set of SS blocks during the DRS interval using one or more transmission beams of the set of transmission beams. The operations of block 1315 may be performed according to the methods described with reference to FIGS. 1 through 4. In certain examples, aspects of the operations of block 1315 may be performed by a DRS transmission component as described with reference to FIGS. 5 through 8.

At block 1320, the base station 105 may receive, from a first UE, a random access message during the DRS interval based on the random access configuration for at least one SS block of the set of SS blocks. The operations of block 1320 may be performed according to the methods described with reference to FIGS. 1 through 4. In certain examples, aspects of the operations of block 1320 may be performed by a random access component as described with reference to FIGS. 5 through 8.

Figure 14:
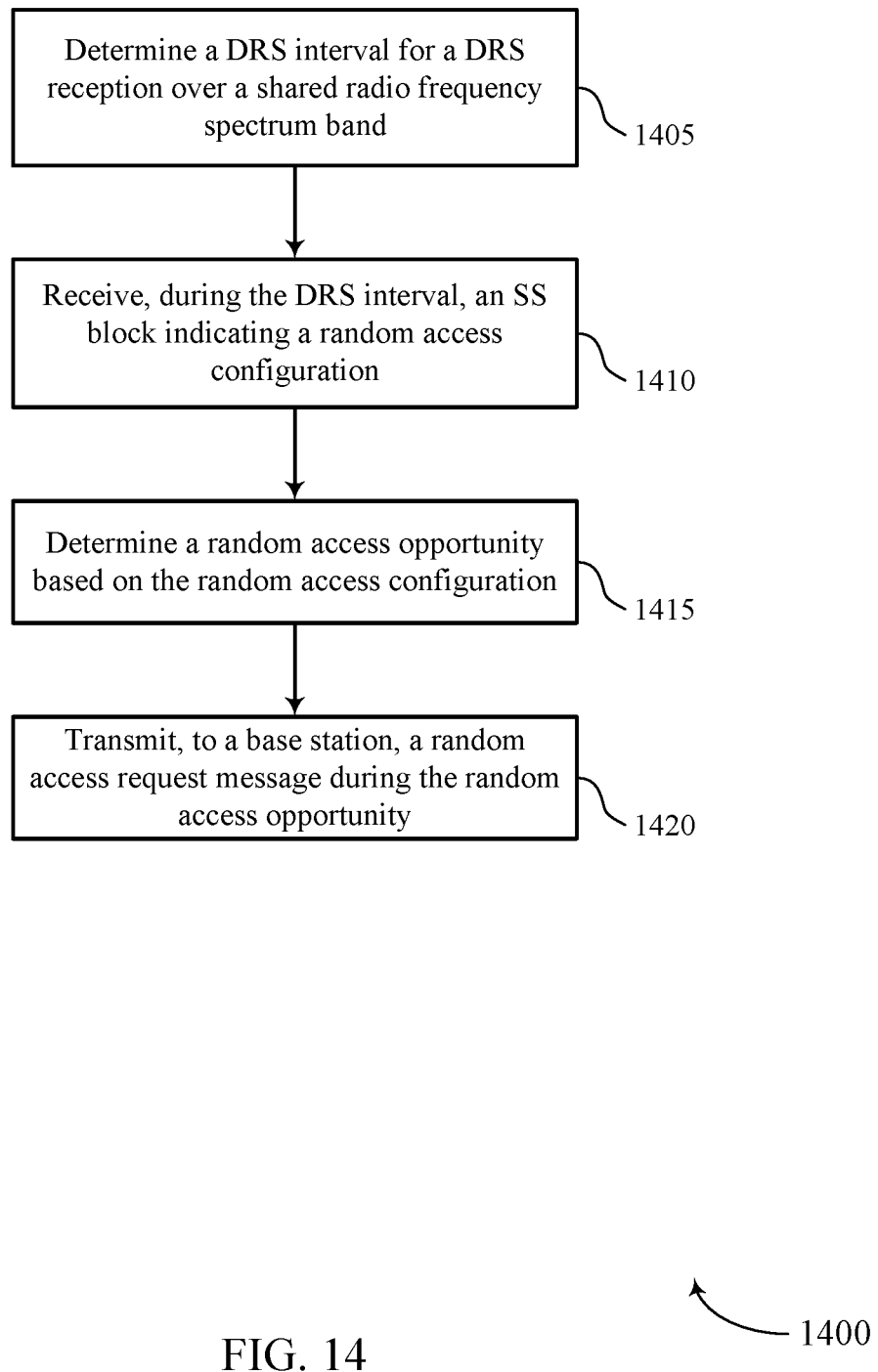

FIG. 14 shows a flowchart illustrating a method 1400 for discovery and random access for shared spectrum in accordance with aspects of the present disclosure. The operations of method 1400 may be implemented by a UE 115 or its components as described herein. For example, the operations of method 1400 may be performed by a UE DRS manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1405, the UE 115 may determine a DRS interval for reception of a DRS over a shared radio frequency spectrum band. The operations of block 1405 may be performed according to the methods described with reference to FIGS. 1 through 4. In certain examples, aspects of the operations of block 1405 may be performed by an interval component as described with reference to FIGS. 9 through 12.

At block 1410, the UE 115 may receive, during the DRS interval, a SS block indicating a random access configuration. The operations of block 1410 may be performed according to the methods described with reference to FIGS. 1 through 4. In certain examples, aspects of the operations of block 1410 may be performed by a SS block receiver as described with reference to FIGS. 9 through 12.

At block 1415, the UE 115 may determine a random access opportunity based on the random access configuration. The operations of block 1415 may be performed according to the methods described with reference to FIGS. 1 through 4. In certain examples, aspects of the operations of block 1415 may be performed by an opportunity component as described with reference to FIGS. 9 through 12.

At block 1420, the UE 115 may transmit, to a base station, a random access request message during the random access opportunity. The operations of block 1420 may be performed according to the methods described with reference to FIGS. 1 through 4. In certain examples, aspects of the operations of block 1420 may be performed by a transmission component as described with reference to FIGS. 9 through 12.

In some examples, aspects from two or more of the methods may be combined. It should be noted that the methods are just example implementations, and that the operations of the methods may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 as described with reference to FIGS. 1 through 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   determining a discovery reference signal (DRS) interval for transmission of a DRS over a shared radio frequency spectrum band;
   determining a set of synchronization signal (SS) blocks for transmission of the DRS based at least in part on a set of transmission beams, wherein each SS block of the set of SS blocks indicates a random access configuration;
   transmitting, over the shared radio frequency spectrum band, the set of SS blocks during the DRS interval using one or more transmission beams of the set of transmission beams; and
   receiving, from a first user equipment (UE), a random access message during the DRS interval based at least in part on the random access configuration for at least one SS block of the set of SS blocks.

2. The method of claim 1, further comprising:
   receiving a DRS initiation request from the first UE; and
   transmitting an opportunistic DRS based at least in part on the received DRS initiation request.

3. The method of claim 2, further comprising:
   transmitting the opportunistic DRS within a fixed timing offset after receiving the DRS initiation request.

4. The method of claim 2, further comprising:
   transmitting the opportunistic DRS concurrently with a control channel or a shared channel over at least one transmission beam of the set of transmission beams.

5. The method of claim 2, wherein the opportunistic DRS is transmitted to one or both of the first UE or a second UE different from the first UE.

6. The method of claim 1, wherein transmitting the set of SS blocks during the DRS interval comprises:
   repeating a subset of SS blocks of the set of SS blocks within an SS burst, wherein at least one SS block within the subset of SS blocks indicates a random access opportunity.

7. The method of claim 6, wherein at least one SS block indicates the random access opportunity in both an initial transmission and a subsequent transmission.

8. The method of claim 6, wherein a first SS block of the subset of SS blocks indicates a first random access opportunity and a second block of the subset of SS blocks indicates a second random access opportunity different from the first random access opportunity.

9. The method of claim 6, wherein an SS block of the subset of SS blocks in an initial transmission comprises a different cyclical shift for a first physical broadcast channel (PBCH) transmitted within the SS block from a second PBCH transmitted within a corresponding SS block in a subsequent transmission.

10. The method of claim 6, wherein an SS block of the subset of SS blocks in an initial transmission comprises a first physical broadcast channel (PBCH) payload that is different from a second PBCH payload of a corresponding SS block in a subsequent transmission.

11. The method of claim 10, wherein a payload difference between the first PBCH payload and the second PBCH payload is based at least in part on a first index associated with the SS block and a second index associated with the corresponding SS block in the subsequent transmission.

12. The method of claim 6, wherein an SS block of the subset of SS blocks in an initial transmission comprises a different cyclical shift for a first synchronization signal transmitted within the SS block from a second synchronization signal transmitted within a corresponding SS block in a subsequent transmission.

13. The method of claim 1, wherein at least one of the determined set of SS blocks indicates a subframe offset.

14. The method of claim 1, wherein the DRS comprises an indication of a DRS type.

15. The method of claim 14, wherein a physical broadcast channel (PBCH) of the DRS comprises the indication and the DRS type comprises one of a multi-beam DRS or an opportunistic DRS.

16. The method of claim 1, wherein an index of each SS block in the set of SS blocks maps to multiple random access opportunities within the DRS interval.

17. The method of claim 1, wherein the random access configuration indicates at least one of a cyclic shift for a user equipment (UE), a frequency resource for the UE, an SS block index, a Walsh code index, an orthogonal cover code (OCC) index, or any combination thereof.

18. The method of claim 1, further comprising:
transmitting each SS block of the set of SS blocks over a corresponding transmission beam of the set of transmission beams.

19. The method of claim 1, further comprising:
performing a listen before talk (LBT) procedure for the DRS prior to transmitting at least one SS block in the set of SS blocks.

20. A method for wireless communication, comprising:
determining a discovery reference signal (DRS) interval for reception of a DRS over a shared radio frequency spectrum band;
receiving, during the DRS interval, a synchronization signal (SS) block indicating a random access configuration;
determining a random access opportunity based at least in part on the random access configuration; and
transmitting, to a base station, a random access request message during the random access opportunity.

21. The method of claim 20, further comprising:
determining, based at least in part on the random access configuration, at least one of a cyclic shift for a user equipment (UE), a frequency resource for the UE, an SS block index, a Walsh code index, an orthogonal cover code (OCC) index, or any combination thereof.

22. The method of claim 20, further comprising:
determining multiple random access opportunities based at least in part on an index of the received SS block.

23. The method of claim 20, further comprising:
receiving, during the DRS interval, multiple repetitions of a set of SS blocks within an SS burst, wherein at least one SS block within the set of SS blocks indicates one or more random access opportunities.

24. The method of claim 20, wherein an SS block index or a physical broadcast channel (PBCH) within the DRS comprises an indication of a DRS type.

25. The method of claim 20, further comprising:
transmitting a DRS initiation request to the base station; and
receiving an opportunistic DRS based at least in part on the DRS initiation request.

26. An apparatus for wireless communication, in a system comprising:
a processor;
memory in electronic communication with the processor; and
instructions stored in the memory, wherein the instructions are executable by the processor to:
determine a discovery reference signal (DRS) interval for transmission of a DRS over a shared radio frequency spectrum band;
determine a set of synchronization signal (SS) blocks for transmission of the DRS based at least in part on a set of transmission beams, wherein each SS block of the set of SS blocks indicates a random access configuration;
transmit, over the shared radio frequency spectrum band, the set of SS blocks during the DRS interval using one or more transmission beams of the set of transmission beams; and
receive, from a first user equipment (UE), a random access message during the DRS interval based at least in part on the random access configuration for at least one SS block of the set of SS blocks.

27. The apparatus of claim 26, wherein the instructions are further executable by the processor to:
receive a DRS initiation request from the first UE; and
transmit an opportunistic DRS based at least in part on the received DRS initiation request.

28. The apparatus of claim 27, wherein the instructions are further executable by the processor to:
transmit the opportunistic DRS within a fixed timing offset after receiving the DRS initiation request.

29. The apparatus of claim 26, wherein the instructions executable by the processor to transmit the set of SS blocks during the DRS interval comprise instructions executable by the processor to:
repeat a subset of SS blocks of the set of SS blocks within an SS burst, wherein at least one SS block within the subset of SS blocks indicates a random access opportunity.

30. An apparatus for wireless communication, in a system comprising:
a processor;
memory in electronic communication with the processor; and
instructions stored in the memory, wherein the instructions are executable by a processor to:
determine a discovery reference signal (DRS) interval for reception of a DRS over a shared radio frequency spectrum band;
receive, during the DRS interval, a synchronization signal (SS) block indicating a random access configuration;
determine a random access opportunity based at least in part on the random access configuration; and
transmit, to a base station, a random access request message during the random access opportunity.

* * * * *